United States Patent
Sasu et al.

(10) Patent No.: US 7,025,566 B2
(45) Date of Patent: Apr. 11, 2006

(54) HYBRID VANE ISLAND DIFFUSER

(75) Inventors: Ioan Sasu, Brossard (CA); Doug Roberts, Cambridge (CA); Oleg Morenko, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/699,693

(22) Filed: Nov. 4, 2003

(65) Prior Publication Data

US 2005/0095127 A1 May 5, 2005

(51) Int. Cl.
*F01D 9/02* (2006.01)

(52) U.S. Cl. ................... 415/208.3; 415/209.1

(58) Field of Classification Search ............. 415/208.4, 415/224.5, 182.1, 183, 185, 208.1, 208.2, 415/208.3, 209.1
See application file for complete search history.

(56) References Cited

U.S. PATENT DOCUMENTS

| | | | |
|---|---|---|---|
| 3,879,939 A | 4/1975 | Markowski | |
| 4,100,732 A | 7/1978 | Bryans et al. | |
| 4,251,183 A | 2/1981 | Liu et al. | |
| 4,344,737 A | 8/1982 | Liu | |
| RE31,259 E | 5/1983 | Gopalakrishnan et al. | |
| 4,854,126 A * | 8/1989 | Chevis et al. | 415/208.3 |
| 5,320,489 A | 6/1994 | McKenna | |
| 5,564,898 A | 10/1996 | Richards et al. | |
| 5,704,211 A | 1/1998 | Hatfield | |
| 6,123,506 A | 9/2000 | Brand et al. | |
| 6,279,322 B1 | 8/2001 | Moussa | |
| 6,280,139 B1 | 8/2001 | Romani et al. | |
| 6,471,475 B1 | 10/2002 | Sasu et al. | |
| 6,488,469 B1 | 12/2002 | Youssef et al. | |

OTHER PUBLICATIONS

Merriam-Webster's Collegiate Dictionary, Tenth Edition, 1998, Merriam-Webster, Incorporated, p. 607.*

* cited by examiner

*Primary Examiner*—Edward K. Look
*Assistant Examiner*—Richard A. Edgar
(74) *Attorney, Agent, or Firm*—Ogilvy Renault LLP

(57) ABSTRACT

A gas turbine engine diffuser comprises a bowl-shaped diffuser casing and a cover nested into the bowl-shaped diffuser casing and cooperating therewith in defining a diffuser passage having a channeled entry portion in fluid flow communication with a vaned exit portion via a vaneless intermediate portion. The channeled entry portion is divided into an array of inlet flowpaths by a first set of vanes. Likewise, the vaned exit portion is divided into an array of outlet flowpaths by a second set of vanes.

31 Claims, 3 Drawing Sheets

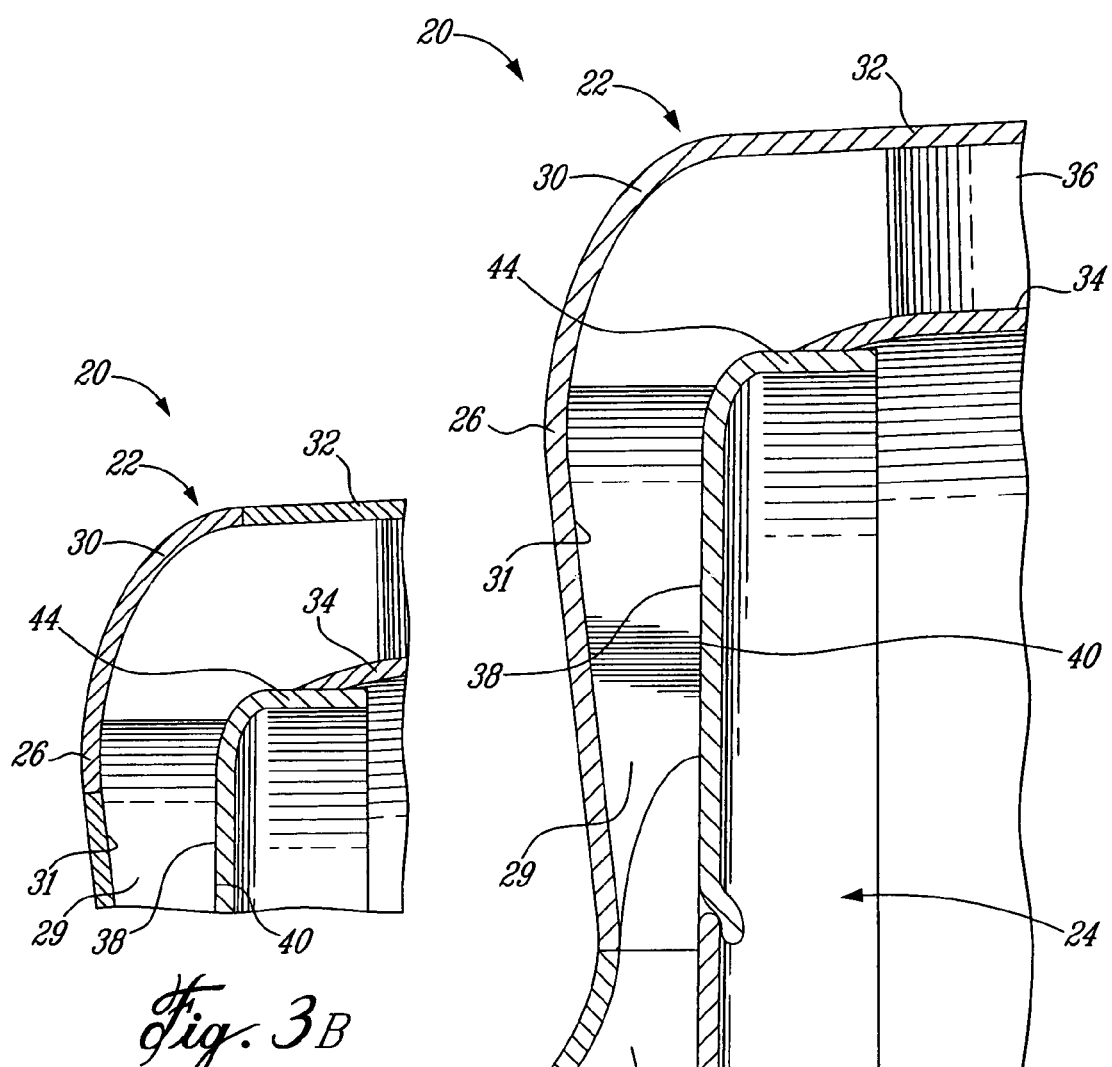
Fig. 3B
Fig. 3A
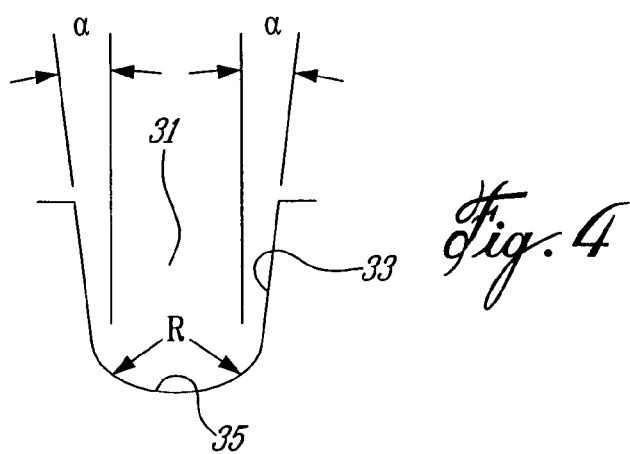
Fig. 4

HYBRID VANE ISLAND DIFFUSER

BACKGROUND OF THE INVENTION

1. Field of the Invention

The present invention relates to gas turbine engines and, more particularly, to a diffuser for directing a flow of compressed air with a radial component to a diffused annular flow having an axial component.

2. Description of the Prior Art

Conventional gas turbine engine diffusers comprise a machined ring which surrounds the periphery of a compressor impeller for capturing a radial flow of compressed air and redirecting it through generally tangential orifices into an array of diffuser pipes. Fabrication of the diffuser pipes is extremely complex since they have a flared internal pathway that curves from a generally radial tangential direction to an axial rearward direction. Each pipe must be manufactured to close tolerances individually and then assembled to the machined diffuser ring. Complex tooling and labor intensive manufacturing procedures result in a relatively high cost for the preparation of the diffusers.

In an attempt to reduce the tooling and the manufacturing costs, it has been proposed to manufacture a diffuser from two concentric nested shells see U.S. Pat. No. 6,471,475, secured together by brazing, one of the shells being provided with grooves separated by seam edges while the other shell is provided with a smooth surface of revolution. The groove on the one shell are closed by the other shell when the shells are nested together and the seam edges are secured to the smooth surface thus defining individual ducts extending continuously from the compressor impeller to the outer shell edges.

Although the above-described diffuser design greatly reduces the tooling and manufacturing costs associated with prior art diffuser assemblies, the pursuit of increased efficiency at decreased cost makes improvement ever-desirable.

SUMMARY OF THE INVENTION

It is therefore an aim of the present invention to simplify the fabrication of a gas turbine engine diffuser.

Therefore, in accordance with the present invention, there is provided a gas turbine engine diffuser comprising a bowl-shaped diffuser casing and a cover nested into the bowl-shaped diffuser casing and cooperating therewith in defining a diffuser passage having a channeled entry portion in fluid flow communication with a vaned exit portion via a vaneless intermediate portion, said channeled entry portion being divided into an array of inlet flowpaths by a first set of vanes, and wherein said vaned exit portion is divided into an array of outlet flowpaths by a second set of vanes.

In accordance with a further general aspect of the present invention, there is provided a diffuser for directing a flow of compressed air with a radial component to a diffused annular flow having an axial component, the diffuser comprising a diffuser casing including: a generally radially extending surface having a first array of vanes integrally formed on a rearwardly facing side thereof, and a generally axially extending annulus projecting rearwardly from a periphery of said radially extending surface, said annulus being provided with a second array of vanes defining a plurality of exit air passages through said annulus; and a cover adapted to cooperate with said first array of vanes when secured to said diffuser casing in order to define therewith a plurality of entry air passages in communication with said exit air passages.

In accordance with a further general aspect of the present invention, there is provided a diffuser comprising an integrated opened island diffuser casing having a plurality of island vanes, the opened island diffuser casing being closed by a cover, the island vanes and the cover cooperating to define a plurality of D-shaped entry passages leading to a vaneless annular bend, the vaneless annular bend opening to an annular array of exit passages defined by a set of deswirl vanes.

In accordance with a further general aspect of the present invention, there is provided a method of making a diffuser for directing a flow of compressed air with a radial component to a diffused annular flow having an axial component, the method comprising the steps of: providing a bowl-shaped casing having an annular disc surface provided with a circumferential array of island vanes, and an annulus projecting axially from a periphery of the disc surface, said annulus defining a circumferential array of axially extending exit passages, and securely nesting a cover in said bowl-shaped casing to cooperate with said island vanes to form a circumferential array of generally radially oriented inlet passages in fluid flow communication with said axially extending exit passages.

BRIEF DESCRIPTION OF THE DRAWINGS

Having thus generally described the nature of the invention, reference will now be made to the accompanying drawings, showing by way of illustration a preferred embodiment thereof, and in which:

FIG. 3a is a partial radial sectional view of the diffuser assembly shown in FIG. 2;

FIG. 3b is a partial radial sectional view of another embodiment of the diffuser assembly; and FIG. 4 is a schematic view of a cross-section of one air entry passage of the diffuser assembly.

DESCRIPTION OF THE PREFERRED EMBODIMENTS

Figure 1:
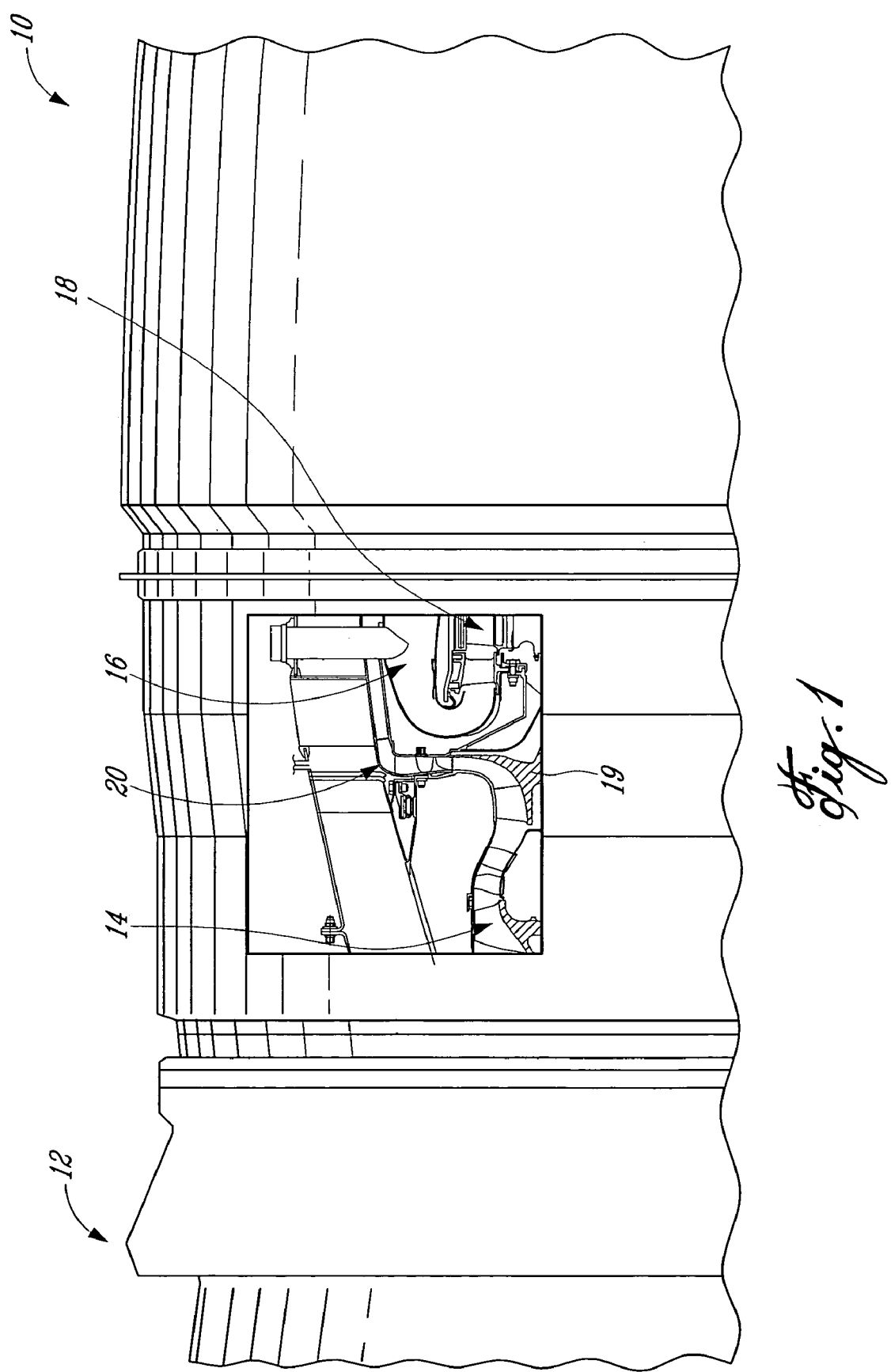
FIG. 1 is a side view, partly broken away, of a gas turbine engine to which an embodiment of the present invention is applied.

FIG. 1 illustrates a subsonic gas turbine engine 10 generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine 18 for extracting energy from the combustion gases.

The last stage of the illustrated compressor 14 comprises a high-pressure centrifugal impeller 19. The centrifugal impeller 19 directs the compressed air radially outwardly into a diffuser 20. The diffuser 20 redirects the compressed air from a radial direction to a diffused annular axial rearward flow into the combustor 16.

Figure 2:
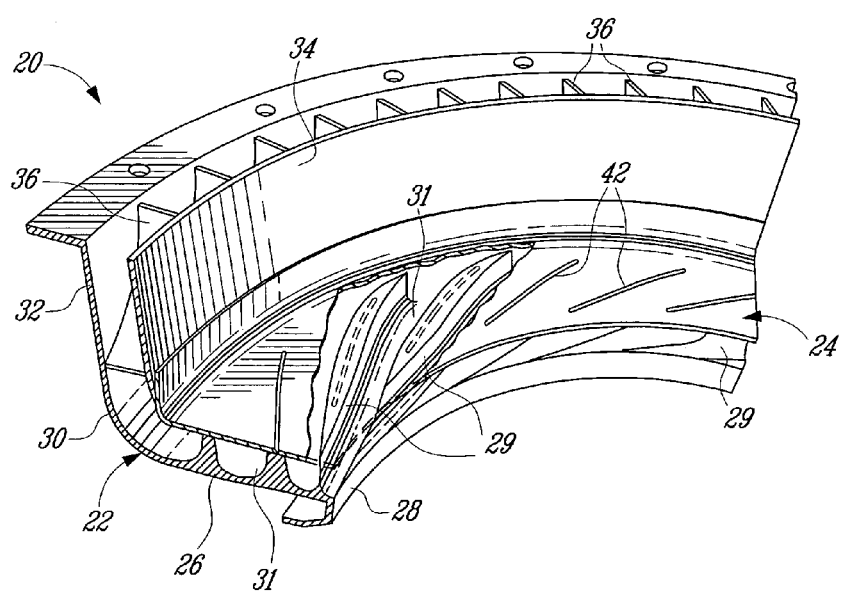
FIG. 2 is a perspective view, partly broken away, of a portion of a diffuser assembly according to a preferred embodiment of the present invention.

As shown in FIG. 2, the diffuser 20 according to the present invention is preferably of a two-piece construction and generally comprises an integrated opened island diffuser casing 22 and a separate annular cover 24. The casing 22 is bowl-shaped and the cover 24 is concentrically nested in the bowl-shaped diffuser casing 22 and secured thereto.

As will be seen hereinafter, the diffuser casing 22 can be provided in the form of a one-piece casting (FIG. 3a) or, alternatively, designed as an assembly of machined pieces and sheet metal pieces (FIG. 3b).

Indeed, the diffuser casing 22 can be provided in the form of a one-piece casting comprising an open-vaned disc 26 having an inner rim 28 circumscribing a central impeller opening. A circumferential array of island vanes 29 (i.e. wide vanes) is integrally formed on an inner surface of the disc 26. The island vanes 29 extend between the inner rim 28 and the periphery of the disc 26 to define a series of radial diffuser grooves 31 having cross-sectional areas of increasing magnitude in a direction away from the inner rim 28. The outer periphery of the open vaned disc 26 merges into an arcuate vaneless annular wall portion 30 defining a 90 degrees bend from radial to axial (see FIG. 3). The annular arcuate wall portion 30 merges into an axially extending annular outer wall portion 32 which cooperates with a concentric axially extending annular inner wall portion 34 to bound a series of deswirl vanes 36 integrally cast therebetween.

To ensure accurate throat and a consistent leading edge shape, the island vanes 29 or at least the entrance surfaces thereof are preferably machined to appropriate finished surface tolerances before the cover 24 be attached thereto. The other cast part of the diffuser casing 22 do not generally requires machining as they have a less critical impact on the flow of compressed air.

Instead of being made from a one-piece casting, the diffuser casing 22 could be designed as an assembly in which the vaned disc 26, the situate wall 30, the straight outer annular wall portion 32, the inner annular wall portion 34 and the deswirl vanes 36 are separate pieces adapted to be assembled together in a diffuser casing configuration (see FIG. 3b). The vaned disc 26 could be machined in a solid block of material, whereas the arcuate annular wall 30, the annular outer wall portion 32, the annular wall portion 34 and the deswirl vanes 36 could be made from sheet metal. These various pieces could be assembled together as by welding. Such an assembly is advantageous in that it allows reducing the weight of the diffuser by using sheet metal against casting.

The cover 24 has a smooth surface of revolution 38 adapted to be uniformly seated against the free distal end surface 40 of the island vanes 29 in order to close the entry grooves 31 and, thus, form a circumferential array of radial entry passages. For simplicity, the cover 24 may be a sheet metal part, joined mechanically on the diffuser casing 22 e.g. brazed, welded, bolted, etc. For the brazed version, to ensure a good contact during brazing, the cover 24 may be press-fit mounted. Equidistant slots 42 may be cut in the opposite region of each island vane 29, which may be filled with the brazing paste during the brazing process. In the illustrated embodiment, the cover 24 is a simple body of revolution, which is advantageously easy to make. The cover 24 is provided with a peripheral annular ridge 44 for sealing engagement with the inner annular wall portion 34 of the diffuser casing 22.

As shown in FIG. 3, the cover 24 cooperates with the arcuate annular wall portion 30 to define a vaneless intermediate annular passage for receiving the compressed air from the radial air passages defined by the island vanes 29 and the cover 24. The compressed air then passes through a circumferential array of axially extending exit air passages defined by the deswirl vanes 36 and the concentric inner and outer annular wall portions 32 and 34.

As shown in FIG. 2, the cross-section of the grooves 31 on the disc portion has a "D" shape to facilitate casting or machining. Each groove 31 has a cross-section of variable area by variation of the width and of the height as well. As shown in FIG. 4, the sidewalls 33 of each groove 31 are inclined outwardly at an angle α from the vertical. The angle α is preferably about 10 degrees. The sidewalls 33 should not be perpendicular to the bottom 35 of the groove 31 and the cover 24 (i.e. α>0°). Furthermore, sharp corners at the junction of the sidewalls 33 and the bottom 35 of each groove 31 should also be avoided. A curvature of radius R is preferably provided at the junction of the sidewalls 33 and the bottom wall 35 of each groove 31 in order to provide for a smooth transition between the sidewalls 33 and the bottom wall 35 of the groove 31.

The internal vaneless space geometry, which is formed by the repeated intersection of the "D" shaped passages, is chosen because of the advantageous match between the air angle distribution exiting the impeller 19 and the metal angles formed by the leading edges. The D-shaped cross-section has been found to provide unique aerodynamic benefits.

In order to further increase the aerodynamic efficiency, the axial deswirl vanes 36 may be bowed and provided with different leading edge profile such as, straight having an angle different of 90 degrees with the airflow direction, convex, concave, "S", reverse "S", etc.

The present design advantageously provides for easy fabrication as well as a simpler manner of obtaining a diffuser having a hybrid combination of inlet island vanes and outlet deswirl vanes. In contrast to known island vane diffusers in which the vanes have to be sealed to a surrounding turbine structure, the island vanes 29 and the deswirl vanes 36 are integrated to a bowl-shaped diffuser casing and the grooves between the island vanes 29 are closed by nesting a simple dedicated cover in the bowl-shaped diffuser casing. Also the axially extending exit passages formed between the deswirl vanes 36 are radially bounded on opposed sides thereof by a pair of concentric inner and outer annular walls which forms part of the diffuser casing, thereby obviating the need for sealing the deswirl vane to a surrounding turbine casing structure of the gas turbine engine.

It is noted that the integrated opened island diffuser casing 22 may be a module of the gas generator case, integrated into it.

The present diffuser, therefore, is just two parts which are easy to make, especially since no manual work for the casting version (i.e. no welding and no adjustment). The invention also eliminates expensive tooling and leads to good process control, little manual work and a compact structure which reduces vibrations and improves life.

Modifications and improvements to the above-described embodiment of the present invention may become apparent to those skilled in the art. The foregoing description is intended to be exemplary rather than limiting. The scope of the invention is therefore intended to be limited solely by the scope of the appended claims.

What is claimed is:

1. A gas turbine engine diffuser comprising a bowl-shaped diffuser casing and a cover nested into the bowl-shaped diffuser casing and cooperating therewith in defining a diffuser passage having a channeled entry portion in fluid flow communication with a vaned exit portion via a vaneless intermediate portion, said channeled entry portion being divided into an array of inlet flowpaths by a first set of vanes, wherein said vaned exit portion is divided into an array of outlet flowpaths by a second set of vanes, and wherein each of said inlet flowpaths has a D-shaped cross-section.

2. A gas turbine engine diffuser as defined in claim 1, wherein each of the D-shaped flowpaths has a curved portion and an opposite straight portion, the curved portion being provided in a rearwardly facing surface of said bowl-shaped diffuser casing.

3. A gas turbine engine diffuser as defined in claim 1, wherein said first set of vanes extends integrally from an inner surface of said bowl-shaped diffuser casing, and wherein said cover is provided with a substantially smooth inner surface, wherein each vane of said first set of vanes has a free distal end surface adapted to sealingly engage said substantially smooth inner surface of said cover.

4. A gas turbine engine diffuser as defined in claim 1, wherein said bowl-shaped diffuser casing comprises a machined vaned disc on a first side of which are formed said first set of vanes, said first set of vanes being covered by said cover, said bowl-shaped diffuser casing further comprising a sheet metal outer annular wall extending axially from a radially outer rim of said machined vaned disc on said first side thereof, and a sheet metal inner annular wall mounted concentrically within said sheet metal outer wall, and wherein said second set of vanes is integrated between said sheet metal inner and outer annular walls.

5. A gas turbine engine diffuser as defined in claim 4, wherein said sheet metal outer annular wall includes an arcuate sheet portion united to a straight sheet portion; the arcuate sheet portion having a vaneless inner surface.

6. A gas turbine engine diffuser as defined in claim 4, wherein the vanes of said second set of vanes are made from sheet metal.

7. A gas turbine engine diffuser as defined in claim 1, wherein said bowl-shaped diffuser casing comprises a one-piece casting including a vaned disc on a first side of which are formed said first set of vanes, and an annulus extending from said first side of said vaned disc, said annulus including inner and outer annular walls integrally connected to each other by said second set of vanes.

8. A gas turbine engine diffuser as defined in claim 1, wherein said cover includes a flat annular plate.

9. A gas turbine engine diffuser as defined in claim 8, wherein said vanes of said first set of vanes are circumferentially distributed on a generally radially extending inner surface of said bowl-shaped diffuser casing, and wherein said flat annular plate has a relatively smooth inner surface for closing a series of grooves defined on said inner surface of said bowl-shaped diffuser casing by said first set of vanes.

10. A gas turbine engine diffuser as defined in claim 9, wherein a peripheral ridge extends from an outer surface of said flat annular plate for engagement with an annular inner sidewall of said bowl-shaped diffuser casing.

11. A gas turbine engine diffuser as defined in claim 1, wherein said first set of vanes includes island vanes having machined entrance surfaces.

12. A diffuser for directing a flow of compressed air with a radial component to a diffused annular flow having an axial component, the diffuser comprising:
   a diffuser casing including:
      a generally radially extending surface having a first array of vanes integrally formed on a rearwardly facing side thereof, and
      a generally axially extending annulus projecting rearwardly from a periphery of said radialy extending surface, said annulus being provided with a second array of vanes defining a plurality of exit air passages through said annulus, the annulus having inner and outer annular walls integrally connected to each other by said second array of vanes; and
   a cover adapted to cooperate with said first array of vanes when secured to said diffuser casing in order to define therewith a plurality of entry air passages in communication with said exit air passages, said cover being in sealing engagement with both said inner annular wall and said first array of vanes.

13. A diffuser as defined in claim 12, wherein said entry air passages have a D-shaped cross-section.

14. A diffuser as defined in claim 12, wherein said diffuser casing has a bowl-shaped, and wherein said cover is adapted to be placed in said bowl-shaped diffuser casing.

15. A diffuser as defined in claim 14, wherein said cover is pressure fitted in said bowl-shaped diffuser casing.

16. A diffuser as defined in claim 12, wherein said first array of vanes includes island vanes having machined surfaces.

17. A diffuser as defined in claim 12, wherein said diffuser casing is a one-piece casting.

18. A diffuser as defined in claim 12, wherein there is provided a vaneless arcuate intermediate passage between said entry and exit air passages.

19. A diffuser as defined in claim 18, wherein said vaneless arcuate intermediate passage defines a bend from radial to axial.

20. A diffuser as defined in claim 12, wherein said outer annular wall is assembled to a machined vaned disc on which is provided said radially extending surface.

21. A diffuser as defined in claim 20, wherein said vanes of said second array of vanes are made of sheet metal.

22. A diffuser as defined in claim 17, wherein said cover is made of sheet metal.

23. A diffuser as defined in claim 22, wherein said cover has a relatively smooth surface of revolution adapted to be secured to a free distal end surface of the vanes of the first array of vanes.

24. A diffuser comprising an integrated opened diffuser casing having a plurality of vanes, the opened diffuser casing being closed by a cover, the vanes and the cover cooperating to define a plurality of D-shaped entry passages leading to a vaneless annular bend, the vaneless annular bend opening to an annular array of exit passages defined by a set of deswirl vanes.

25. A diffuser as defined in claim 24, wherein said diffuser casing comprises a one-piece casting including a vaned disc on a first side of which are formed said vanes, and an annulus extending from said first side of said varied disc, said annulus including inner and outer annular walls integrally connected to each other by said second set of vanes.

26. A diffuser as defined in claim 24, wherein said diffuser casing comprises a machined varied disc on a first side of which are formed said vanes, said vanes being covered by said cover, said diffuser casing further comprising a sheet metal outer annular wall extending axially from a radially outer rim of said machined vaned disc on said first side thereof, and a sheet metal inner annular wall mounted concentrically within said sheet metal outer wall, and wherein said set of deswirl vanes is integrated between said sheet metal inner and outer annular walls.

27. A method of making a diffuser for directing a flow of compressed air with a radial component to a diffused annular flow having an axial component, the method comprising the steps of: providing a bowl-shaped casing having an annular disc surface provided with a circumferential array off island vanes, and an annulus projecting axially from a periphery of the disc surface, said annulus defining a circumferential array off axially extending exit passages, securely nesting a cover in said bowl-shaped casing to cooperate with said island vanes to form a circumferential array of generally radially oriented inlet passages in fluid flow communication with said axially extending exit passages, and sealingly engaging an axially extending annular portion of the cover with an inner annular wall of said annulus.

28. A method as defined in claim 27, wherein said disc surface with said island vanes thereon and said annulus are integrally cast.

29. A method as defined in claim 27, wherein the step of providing said bowl-shaped casing comprises the step of integrating deswirl vanes in said annulus.

30. A method as defined in claim 27, wherein the step of providing said bowl-shaped casing comprises the steps of machining said annular disc surface with said vane island thereon, forming said annulus by radially bounding a set of deswirl vanes between concentric annular inner and outer sheet metal walls, and securing said annulus to said machined annular disc surface.

31. A gas turbine engine diffuser comprising a bowl-shaped diffuser casing and a cover nested into the bowl-shaped diffuser casing and cooperating therewith in defining a diffuser passage having a channeled entry portion in fluid flow communication with a vaned exit portion via a vaneless intermediate portion, said channeled entry portion being divided into an array of inlet flowpaths by a first set of vanes, and wherein said vaned exit portion is divided into an array of outlet flowpaths by a second set of vanes, wherein said bowl-shaped diffuser casing comprises a machined varied disc on a first side of which are formed said first set of vanes, said first set of vanes being covered by said cover, said bowl-shaped diffuser casing further comprising a sheet metal outer annular wall extending axially from a radially outer rim of said machined vaned disc on said first side thereof, and a sheet metal inner annular wall mounted concentrically within said sheet metal outer wall, and wherein said second set of vanes is integrated between said sheet metal inner and outer annular walls.

* * * * *